(No Model.)
T. B. EIKER.
EDUCATIONAL PUZZLE.
No. 560,485. Patented May 19, 1896.
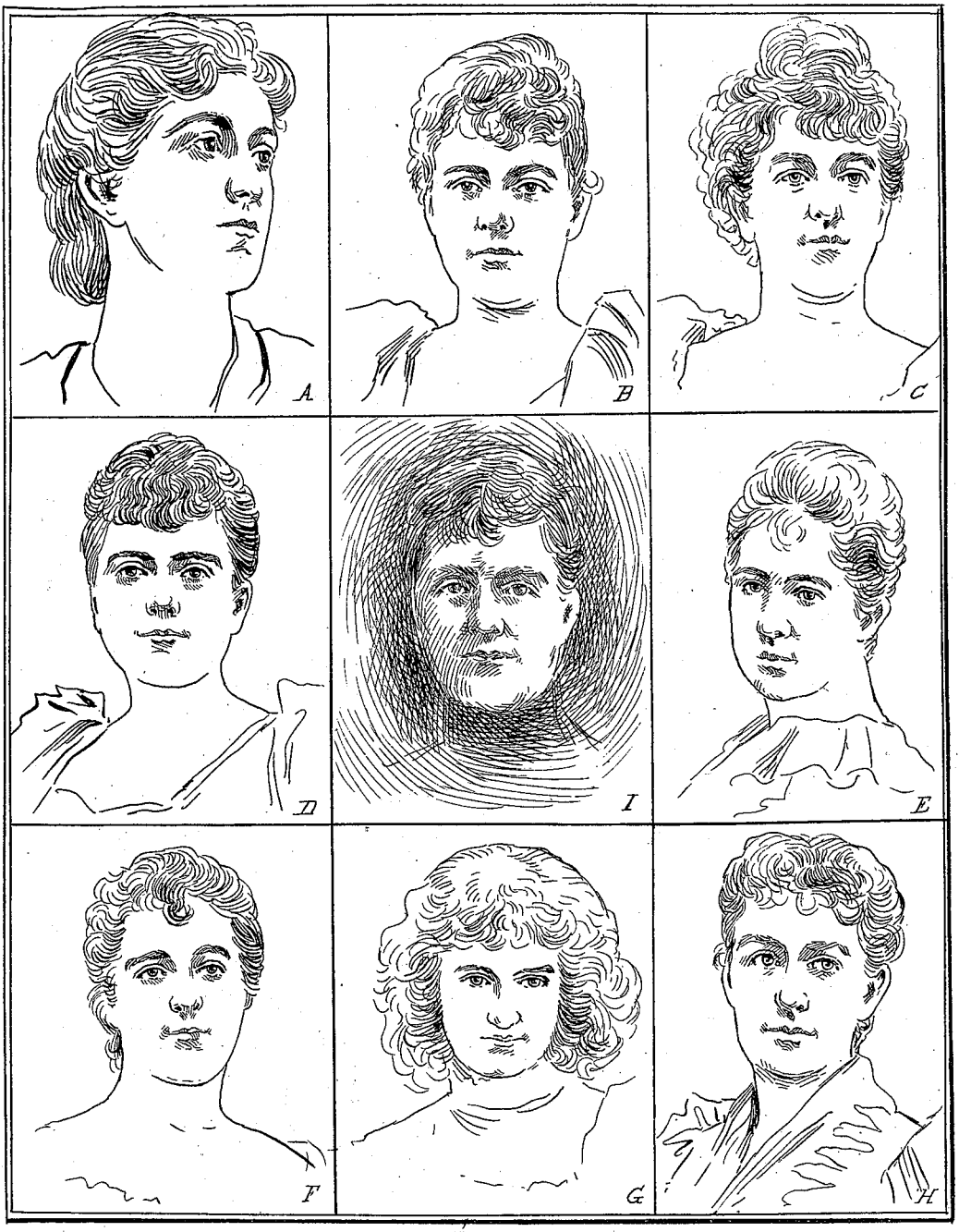
WITNESSES
John B. Pannes
W. D. Neilley
INVENTOR
Thaddeus B. Eiker
BY
Andrew Wilson.
ATTORNEY.

UNITED STATES PATENT OFFICE.

THADDEUS B. EIKER, OF HACKENSACK, NEW JERSEY.

EDUCATIONAL PUZZLE.

SPECIFICATION forming part of Letters Patent No. 560,485, dated May 19, 1896.

Application filed September 21, 1895. Serial No. 563,212. (No model.)

*To all whom it may concern:*

Be it known that I, THADDEUS B. EIKER, a citizen of the United States, residing at Hackensack, Bergen county, New Jersey, have invented certain new and useful Improvements in Educational Puzzles, of which the following is a specification.

My invention relates to that class of puzzles which are intended to train the eye in the tracing out of corresponding lines in separate figures, thereby developing the artistic faculties and inducing a close examination of the figures, whereby their details will become fixed in the mind and the student's powers of analysis and discrimination will be improved and strengthened. The slighter and more subtle the differences between the various figures may be the more careful must be the comparison and the more valuable will be the training derived from their comparison. It is desirable that the subjects employed should of themselves be such as to interest and instruct, so that the exercise in solving the puzzle may be both pleasant and profitable. I accomplish these objects by employing primary figures, the subjects of some, but not all, of which also enter into the formation of a composite figure, the test consisting in deciding which of the primary forms enter into the composite form and which are omitted.

In the drawing I have shown a ground or plat upon which are arranged a number of original portraits surrounding a composite portrait, in the formation of which a portion only of the original portaits have been used.

J is a ground or plat of a size adapted to receive a series of portraits A to I, inclusive. A to H are original portraits, and I is a composite portrait formed by using the lines of a part only of the other portraits, in this instance B, D, F, and H.

To facilitate the comparison and admit of forming new combinations, the portraits may be formed upon transparent or translucent material—such as paper, celluloid, or similar material—and may be formed on separate cards, so that their position upon the ground may be changed, and they may be placed one upon another, in order to obtain the effect of the combination of the lines of the various faces in composite form. This also admits of a number of composite faces being employed with the original primary faces, so that when one combination has been solved another may be taken up. In this manner the student may analyze the changes which are produced by combining any of the various primary faces, and this will lead to a close analysis of the faces and may be made of great educational value where the portraits of prominent or historical persons are employed.

It will be understood that various figures and forms may be used instead of faces, so long as there is a certain similarity between the primary forms and the composite form which will demand care in comparing the various details of similarity and dissimilarity and in discovering the component factors of the composite form.

Having thus described my invention, what I claim, and desire to secure by Letters Patent of the United States, is—

1. In an educational puzzle, the combination of a number of primary figures, upon transparent or translucent grounds and a composite figure embracing the features of some but not all of said primary figures.

2. In an educational puzzle, the combination of a plat or ground, a series of movable cards, provided with primary figures, and a composite figure embracing the features of some, but not all, of the primary figures, said figures being adapted to be arranged upon said ground, substantially as described.

3. In an educational puzzle the combination of a number of transparent or translucent cards provided with primary figures, and a similar card provided with a composite figure embracing some but not all of the primary figures.

4. In an educational puzzle the combination of a number of primary forms and a composite form embracing less than the whole of said primary forms, the said primary forms being adapted to be superimposed upon each other to produce the effect of a merging of the common features while their dissimilar features remain distinct, substantially as described.

THADDEUS B. EIKER.

Witnesses:
FRANK J. DUFFY,
WM. D. NEILLEY.